(12) United States Patent
Mik et al.

(10) Patent No.: US 7,536,349 B1
(45) Date of Patent: May 19, 2009

(54) METHOD AND APPARATUS FOR PROCESSING A CHARGE APPLIED TO A FINANCIAL ACCOUNT

(75) Inventors: Magdalena Mik, Wallingford, CT (US);
Jay S. Walker, Ridgefield, CT (US);
Daniel E. Tedesco, New Canaan, CT (US); Andrew S. Van Luchene, Norwalk, CT (US); James A. Jorasch, Stamford, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/098,481

(22) Filed: Jun. 16, 1998

(51) Int. Cl.
*G06Q 40/00* (2006.01)
*G06F 17/60* (2006.01)

(52) U.S. Cl. .................. 705/39; 705/2; 705/4

(58) Field of Classification Search ............ 705/2, 705/3, 4, 30, 35–40
See application file for complete search history.

(56) References Cited

U.S. PATENT DOCUMENTS

| | | | |
|---|---|---|---|
| 3,793,624 A | 2/1974 | Vaskunas et al. | |
| 4,443,027 A | 4/1984 | McNeely et al. | 283/83 |
| 4,593,936 A | 6/1986 | Opel | 283/112 |
| 4,700,055 A | 10/1987 | Kashkashian, Jr. | 235/379 |
| 4,707,592 A | 11/1987 | Ware | 235/379 |
| 4,837,422 A | 6/1989 | Dethloff et al. | 235/380 |
| 4,847,890 A | 7/1989 | Solomon et al. | |
| 4,858,121 A * | 8/1989 | Barber et al. | 705/2 |
| 4,882,675 A | 11/1989 | Nichtberger et al. | |
| 4,891,503 A | 1/1990 | Jewell et al. | |
| 5,010,485 A | 4/1991 | Bigari et al. | |
| 5,173,594 A | 12/1992 | McClure | |
| 5,226,073 A | 7/1993 | Albal et al. | |
| 5,276,311 A | 1/1994 | Hennige | 235/380 |
| 5,310,997 A | 5/1994 | Roach et al. | |
| 5,319,701 A | 6/1994 | Hird et al. | |

(Continued)

FOREIGN PATENT DOCUMENTS

WO  WO 98/39910  2/1998

(Continued)

OTHER PUBLICATIONS

Postman, Lore; "Medical Accounts to Fuel Growth of Computer Firm", Mar. 11, 1996; vol. 16, No. 52, p. 10 (2).*

(Continued)

*Primary Examiner*—Hani M. Kazimi
*Assistant Examiner*—Olabode Akintola

(57) ABSTRACT

A billing server receives charge data from a card authorization terminal. The charge data indicates a transaction amount, such as a purchase price, and a first financial account, such as a credit card account. The billing server determines a second financial account that corresponds to the first financial account. For example, the second financial account may be the financial account of an insurance company or other reimbursing party. The billing server also determines a reimbursement amount that corresponds to the first financial account. The second financial account is charged the reimbursement amount. Thus, a portion or all of the transaction amount is paid by a reimbursing party. The second financial account is only charged if a reimbursement rule is satisfied. For example, only purchases made at certain types of merchants may be reimbursed. In addition, the billing server may first request approval before charging the second financial account.

5 Claims, 17 Drawing Sheets

U.S. PATENT DOCUMENTS

| | | | |
|---|---|---|---|
| 5,353,218 A | 10/1994 | De Lapa et al. | |
| 5,384,449 A * | 1/1995 | Peirce | 235/380 |
| 5,477,040 A | 12/1995 | Lalonde | 235/380 |
| 5,485,510 A | 1/1996 | Colbert | |
| 5,530,438 A | 6/1996 | Bickham et al. | |
| 5,539,189 A | 7/1996 | Wilson et al. | |
| 5,557,087 A * | 9/1996 | Duyck | 235/379 |
| 5,559,313 A | 9/1996 | Claus et al. | |
| 5,578,808 A | 11/1996 | Taylor | 235/380 |
| 5,583,760 A * | 12/1996 | Klesse | 705/38 |
| 5,585,787 A | 12/1996 | Wallerstein | 340/825.34 |
| 5,615,110 A | 3/1997 | Wong | |
| 5,621,201 A | 4/1997 | Langhans et al. | 235/380 |
| 5,649,118 A | 7/1997 | Carkisle et al. | |
| 5,655,007 A | 8/1997 | McAllister | |
| 5,684,965 A * | 11/1997 | Pickering | 705/34 |
| 5,708,422 A | 1/1998 | Blonder et al. | |
| 5,745,554 A | 4/1998 | Rozetti | |
| 5,745,556 A | 4/1998 | Ronen | 379/127 |
| 5,864,610 A | 1/1999 | Ronen | 379/127 |
| 5,864,822 A | 1/1999 | Baker, III | 705/14 |
| 5,920,847 A * | 7/1999 | Kolling et al. | 705/40 |
| 5,945,653 A * | 8/1999 | Walker et al. | 235/380 |
| 5,991,750 A * | 11/1999 | Watson | 705/44 |
| 5,999,596 A * | 12/1999 | Walker et al. | 379/91.01 |
| 6,029,144 A * | 2/2000 | Barrett et al. | 705/30 |
| 6,044,360 A | 3/2000 | Picciallo | 705/21 |
| 6,098,053 A * | 8/2000 | Slater | 705/44 |
| 6,125,352 A * | 9/2000 | Franklin et al. | 705/26 |
| 6,208,973 B1 * | 3/2001 | Boyer et al. | 705/2 |

FOREIGN PATENT DOCUMENTS

WO      WO 99/44111      2/1999

OTHER PUBLICATIONS

Business and Travel News; "Airline Tickets Not Ready to Bow Out Just Yet"; 1993; n 264, p. 12.*
PR Newswire; "Banc One and Carenetwork Introduce New Healthcare Payment System"; Mar. 16, 1992.*
Deborah Steinborn, "Health Care Planning", Bank Systems & Technology, Nov. 1992, 29, 11, p. 34.*
Visa® Patient Easy Pay Consent Form on National Information Services' PC software (PR Newswire), Sep. 30, 1996.*
Levaro, R., Leading corporation through the travel management maze, Credit world, St. Louis: May/Jun. 1996, vol. 84, Iss. 5; p. 26.*
Zubeck, P., "State probes memorial billing complaint/Hospital didn't refund overpayment routinely", The Gazette, Colorado Springs, CO., May 24, 1998.*
Brochure: "First Bank Corporate Relocation Card" by First Bank, copied Mar. 1997.
Brochure: "InfoSpan 2.0 Intelligent Information Management" by Visa, copied Jan. 1998.
"Reaching Out in New Directions", First Data Corporation—Merchant Services.
"Trends in E-Commerce Probed at Comdex Session", Newsbytes, Nov. 22, 1996, 2 pp.
Kostrzewa, John, "Two Banks Offer Credit with a Philanthropic Twist", Providence Journal Bulletin, Apr. 10, 1996, 2 pp.
McNulty, Mary Ann "First Bank is First Out With Relocation Card", Business Travel News, Apr. 17, 1995, 2 pp.
Smith, Carol, "Mastercard to Itemize Hotel Charges for Firms", Los Angeles Times, Sep. 28, 1995, 3 pp.
"MasterCard Exclusives for College", (http://www.mastercard.com/cgi-bin/college.sub. form) download date Oct. 31, 1997, 2 pp.
Brochure: "Introducing the Holiday Cards That Will Save You Money This Season", MasterCard, 1997, 4 pp.
Brochure: "Only One Thing Can Make Your First USA Platinum Card This Exciting", First USA, 1997. 4 pp.
Karve, Anite, Internet Commerce Makes the Sale, Part I, Network, vol. 1, No. 5, May 1997, 4 pp.
Notice of Allowability for U.S. Appl. No. 09/036,131 mailed Sep. 13, 1999, 4 pp.
Notice of Allowability for U.S. Appl. No. 09/036,131 mailed Apr. 23, 1999, 4 pp.
Office Action for U.S. Appl. No. 08/883,308 mailed Feb. 25, 1998, 14 pp.
Notice of Allowability for U.S. Appl. No. 08/8883,308 mailed Oct. 26, 1998, 5 pp.

* cited by examiner

| ACCOUNT IDENTIFIER 64 | ACCOUNT HOLDER NAME 66 | ACCOUNT HOLDER BILLING ADDRESS 68 | MAXIMUM BALANCE 70 | AVAILABLE BALANCE 72 |
|---|---|---|---|---|
| 1111-1111-1111-1111 | BILL JONES | 123 MAIN ST. CITY, STATE | $5,000 | $4,975 |
| 1111-1122-2222-2222 | SUE JOHNSON | 87 PLACE LANE TOWN, USA | $7,000 | $3,000 |
| 1111-9824-2345-6523 | TIM SMITH | 18 PLACE RD. TOWN, USA | $10,000 | $7,500 |
| 1111-4397-9371-9571 | MARY PARKER | 21 STREET TOWN, USA | $1,000 | $200 |
| 1111-9471-3856-1936 | SALLY MARTIN | 98 AVENUE TOWN, USA | $4,000 | $1,500 |
| 1111-0385-2987-0973 | MIKE McDONALD | 55 STREET PLACE, USA | $1,500 | $250 |

FIG. 3

| REIMBURSING PARTY IDENTIFIER 90 | REIMBURSING PARTY DESCRIPTOR 92 | TOTAL AMOUNT OF PAYMENT DUE 94 |
|---|---|---|
| R 729 | CORPORATION X | $180.00 |
| R 730 | INSURER Z | $3,482.00 |
| R 731 | GRANDMA JONES | $15.00 |
| R 732 | STOP & SHOP | $0.00 |

FIG. 4

| TRANSACTION IDENTIFIER 110 | MERCHANT IDENTIFIER 112 | POS IDENTIFIER 114 | TRANSACTION DATE 116 | TRANSACTION DESCRIPTION 118 | TRANSACTION AMOUNT 120 |
|---|---|---|---|---|---|
| 987654 | 66666 | AB 123 | 4/7/98 | SIC CODE: 5182 RESTAURANT | $125.00 |
| 123456 | 55555 | CD 234 | 4/7/98 | SIC CODE: MEDICAL CARE PROVIDER | $150.00 |
| 123795 | 99999 | XY 327 | 4/7/98 | MERCHANT CODE: FOOTLOCKER | $100.00 |

ACCOUNT IDENTIFIER 1111-1111-1111-1111  102

100

104 → (row 1)
106 → (row 2)
108 → (row 3)

FIG. 5

ACCOUNT IDENTIFIER 1111-1111-1111-1111  _130_

| REIMBURSING PARTY IDENTIFIER _142_ | REIMBURSEMENT CONDITION _144_ | REIMBURSEMENT AMOUNT _146_ | BILLING DESTINATION _148_ | TIME TO REIMBURSE _150_ | ACCOUNT ALIAS _152_ | ALLOWED FREQUENCY OF TRANSACTIONS _154_ |
|---|---|---|---|---|---|---|
| R 729 | MERCHANT CODE: JOE'S OFFICE SUPPLY | 50% OF TRANSACTION UP TO $80 | OFFICEMANAGER@ CORPX.COM | 60 DAYS | 1111-1111-WJONES | ONE TIME ONLY |
| R 729 | SIC CODE: RESTAURANT | TRANSACTION AMOUNT UP TO $100 | PO BOX 1 CHICAGO, ILLINOIS | 30 DAYS | 1111-1111-WJONES | TWICE / WEEK |
| R 730 | SIC CODE: MEDICAL CARE PROVIDER | 95% OF TRANSACTION AMOUNT | 1 CORPORATE PARK. LOS ANGELES, CA | 30 DAYS | 1234567890 | NO LIMIT |
| R 731 | ALWAYS | POS CODE 234 ($10) | 1 MAIN ST. BOSTON, MA | 30 DAYS | BILLYJONES82 | ONE TIME PER CODE |

ACCOUNT IDENTIFIER 1111-1111-1111-1111  _242_

| REIMBURSING PARTY IDENTIFIER 252 | REIMBURSEMENT CONDITION 254 | COMMUNICATION ADDRESS FOR APPROVAL REQUEST 256 | REIMBURSEMENT AMOUNT 258 | BILLING DESTINATION 260 | TIME TO REIMBURSE 262 | ACCOUNT ALIAS 264 |
|---|---|---|---|---|---|---|
| R 729 | MERCHANT CODE: JOE'S OFFICE SUPPLY | FINANCE@CORPX.COM | 50% OF TRANSACTION UP TO $80 | OFFICEMANAGER@CORPX.COM | 60 DAYS | 1111-1111-WJONES |
| R 729 | SIC CODE: RESTAURANT | 203-555-1234 | TRANSACTION AMOUNT UP TO $100 | PO BOX 1 CHICAGO, ILLINOIS | 30 DAYS | 1111-1111-WJONES |
| R 730 | SIC CODE: MEDICAL CARE PROVIDER | 212-555-8888 | 95% OF TRANSACTION AMOUNT | 1 CORPORATE PARK. LOS ANGELES, CA | 30 DAYS | 1234567890 |
| R 731 | ALWAYS | 617-555-8765 | POS CODE 234 ($10) | 1 MAIN ST. BOSTON, MA | 30 DAYS | BILLYJONES82 |

244 → (row 1)
246 → (row 2)
248 → (row 3)
250 → (row 4)

| TRANSACTION IDENTIFIER 170 | TRANSACTION AMOUNT 172 | CHARGE AMOUNT 174 | PARTY TO CHARGE 176 | BILLING DESTINATION 178 | PAYMENT STATUS 180 |
|---|---|---|---|---|---|
| 987654 | $125.00 | $100.00 | R 729 | PO BOX 1 CHICAGO, IL | BILLED 5/1/98 NOT PAID |
| 987654 | $125.00 | $25.00 | 1111-1111-1111-1111 | 123 MAIN ST. CITY, STATE | BILLED 5/7/98 NOT PAID |

FIG. 12

| ACCOUNT IDENTIFIER 352 | ACCOUNT ALIAS 354 |
|---|---|
| 1111-1111-1111-1111 | 1111-1111-BCDE-EFGH |
| 1111-1122-2222-2222 | 1111-1122-ABCD-EFGH |
| 1111-9824-2345-6523 | 1111-9824-8549-ASIB |
| 1111-4397-9371-9571 | 1111-4397-AGUZ-YEPT |

METHOD AND APPARATUS FOR PROCESSING A CHARGE APPLIED TO A FINANCIAL ACCOUNT

CROSS-REFERENCE TO RELATED APPLICATIONS

The following U.S. Patent Applications: U.S. patent application Ser. No. 08/883,308, entitled "SYSTEM AND METHOD FOR ESTABLISHING AND EXECUTING FUNCTIONS TO AFFECT CREDIT CARD ACCOUNTS AND TRANSACTIONS", filed Jun. 26, 1997 and issued as U.S. Pat. No. 5,945,653 on Aug. 31, 1999 and U.S. patent application Ser. No. 09/036,131 entitled "METHOD AND SYSTEM FOR CONTROLLING AUTHORIZATION OF CREDIT CARD TRANSACTIONS", filed Mar. 6, 1998 and issued as U.S. Pat. No. 5,999,596 on Dec. 7, 1999, are incorporated by reference herein as part of the present disclosure.

FIELD OF THE INVENTION

The present invention relates to methods and apparatus for processing charges applied to financial accounts.

BACKGROUND OF THE INVENTION

Many people are reimbursed by third parties for their purchases. In many cases, such reimbursement arises from a business relation. For example, an employer may reimburse an employee's purchases that are business related. Similarly, an insurer may reimburse all or some portion of an insured party's medical expenses.

The reimbursing party typically requires documentation to verify (i) that the stated amount was actually spent on the purchase, and (ii) that the purchase is of the type that the reimbursing party is willing to pay for. A party to be reimbursed may submit receipts that support his request for reimbursement. The reimbursing party in turn evaluates the submitted documentation, and approves or rejects the request for reimbursement.

Many people use "card-based" financial accounts, such as credit card accounts and debit card accounts, to pay for their purchases. Such card-based financial accounts can provide a secure, flexible and convenient way to pay for many purchases. Parties that use such card-based financial accounts typically receive paper "charge slips" for each transaction (e.g. a purchase or a refund), as well as monthly billing statements documenting transactions made with the card-based financial account. Accordingly, purchases made with card-based financial accounts can readily support requests for reimbursement.

Unfortunately, known processes for evaluating and approving requests for reimbursement suffer substantial shortcomings. Most reimbursing parties are not able or willing to rapidly process documentation supporting requests for reimbursement. Data entry, bureaucratic procedures and manual evaluation of documentation delay the eventual approval or rejection of a request for reimbursement. In addition, data entry may introduce errors, and documentation may be misplaced by either the reimbursing party or the party to be reimbursed. Consequently, the party to be reimbursed may wait long periods of time after a purchase before receiving the corresponding reimbursement. In addition, the reimbursing party often incurs substantial costs in processing requests for reimbursement.

Further shortcomings are particular to parties that use card-based financial accounts. Charge slips and billing statements typically identify the financial account, for example, by credit card account number. Thus, submitting such documentation reveals the financial account to many parties involved in reimbursement approval, and the financial account may therefor become more susceptible to fraudulent use. Blocking the credit card account number from copies of such documentation can be time-consuming and error-fraught for the party to be reimbursed.

In addition, charges to a card-based financial account may be increased by interest and other penalties if the reimbursing party does not provide reimbursement in a timely manner. Thus, the party to be reimbursed may be forced to pay amounts for which he may never be reimbursed. In addition, even if reimbursement is forthcoming, a card holder may have a large amount of charges to be reimbursed. Consequently, he may be close to his balance limit and unable to apply further charges to his account.

To support reimbursement, many employers provide employees with "corporate" credit cards. Corporate credit cards, issued by banks to employers, enable employees to conduct business at the employer's expense. For example, a corporate credit card may be used to purchase entertainment for clients, supplies and travel services. However, employees may abuse the spending privileges afforded by corporate credit cards. Consequently, many employers must thoroughly audit billing statements to ensure the proper use of corporate credit cards. As described above, processing the documentation that supports a request for reimbursement can be burdensome, time consuming and inaccurate. In addition, some types of corporate cards impose liability for all charges on the reimbursing party, which is often undesirable.

To attempt to limit corporate credit card abuse, some corporate credit cards enable the employer to prevent certain types of purchases. For example, First Bank's "Corporate Relocation Card" allows employers to give their employees corporate credit cards to use when relocating. Employers can prevent use of the corporate credit card at certain merchant types, such as bars and casinos. Typically, the issuing bank stores a list of any SIC codes (Standard Industrial Classification codes) or MCCs (Merchant Category Codes) that have been selected to be disallowed by the employer. When the bank receives a request to authorize a charge on the employee's corporate credit card, the bank verifies that the corresponding merchant code is not disallowed. Unfortunately, preventing use of the corporate credit card at certain merchant types does not prevent the employee from overspending at an allowed merchant.

Some accounting software is designed to make auditing corporate credit card accounts more accurate or efficient. For example, Visa provides InfoSpan 2.0 Intelligent Information Management software for use in managing "Visa Corporate" and "Visa Purchasing" accounts. The software is intended to enable employers to "streamline accounting processes" and "reduce administrative expenses," as well as "ensure card spending complies with company policy."

While these products may facilitate the management of corporate credit card accounts, reimbursement will typically remain a lengthy process, and abuse of reimbursement privileges can continue with known systems and methods for reimbursement. It would be advantageous to make the reimbursement process more efficient and convenient for both reimbursing parties and parties to be reimbursed.

SUMMARY OF THE INVENTION

It is an object of the present invention to make the reimbursement process more efficient and convenient for both reimbursing parties and parties to be reimbursed.

In accordance with the present invention, a billing server receives charge data from a card authorization terminal. The charge data indicates a transaction amount, such as a purchase price, and a first financial account, such as a credit card account. The billing server determines a second financial account that corresponds to the first financial account. For example, the second financial account may be the financial account of an insurance company or other reimbursing party. The billing server also determines a reimbursement amount that corresponds to the first financial account, and the second financial account is charged the reimbursement amount. Thus, a portion or all of the transaction amount is paid by a reimbursing party.

The second financial account is charged only if a reimbursement rule is satisfied. For example, only purchases made at certain types of merchants may be reimbursed. In addition, the billing server may first request approval (e.g., from the reimbursing party) before charging the second financial account.

BRIEF DESCRIPTION OF THE DRAWINGS

FIG. 3 is a schematic illustration of an account holder database of the billing server of FIG. 2.

FIG. 4 is a schematic illustration of a reimbursing party database of the billing server of FIG. 2.

FIG. 5 is a schematic illustration of an exemplary record of a transaction database of the billing server of FIG. 2.

FIG. 6 is a schematic illustration of an exemplary record of a reimbursement rules database of the billing server of FIG. 2.

FIG. 10 is a schematic illustration of another embodiment of a record of the reimbursement rules database of the billing server of FIG. 2.

FIG. 12 is a schematic illustration of an exemplary record of another embodiment of the billing statement database of the billing server of FIG. 2.

FIG. 15 is a schematic illustration of an account alias database.

DETAILED DESCRIPTION OF THE PREFERRED EMBODIMENTS

A method and apparatus are provided whereby a portion or all of a transaction amount is charged to the account of a reimbursing party. Compared to know methods and apparatus for reimbursement, the present invention makes the reimbursement process more efficient and convenient for both reimbursing parties and parties to be reimbursed. Such reimbursement may be driven by a business relation, such as when an employer reimburses an employee's purchases, or when an insurer reimburses all or some portion of an insured party's medical expenses. Alternatively, such reimbursement may be driven by generosity or altruism, such as when a relative pays for a gift, or when an employee's donation is matched according to an employer gift-matching program.

Although the term reimbursement and other variations thereof is used herein, those skilled in the art will understand that such terms are convenient labels that do not necessarily imply that there is compensation for money spent or losses incurred by another.

Figure 1:
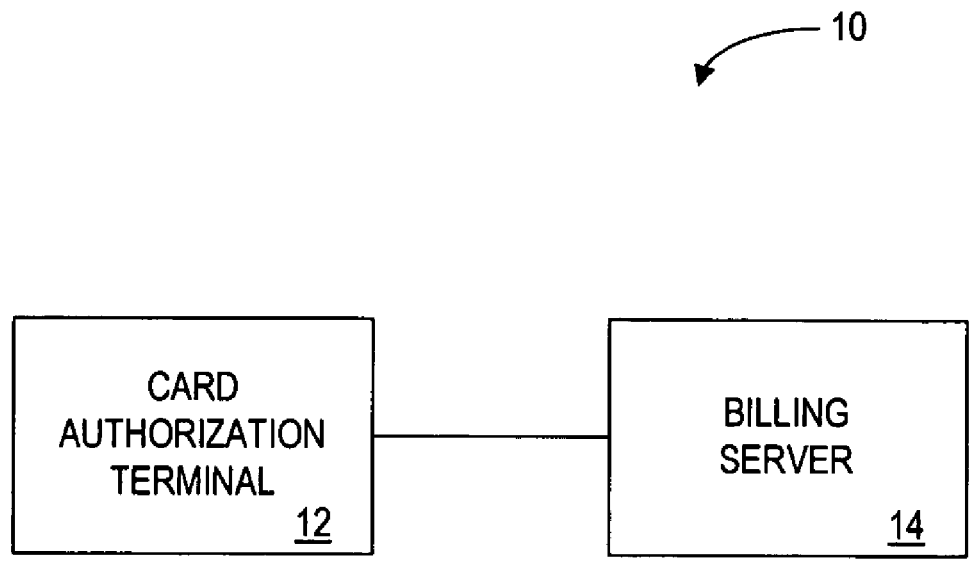
FIG. 1 is a schematic illustration of an embodiment of a reimbursement system provided in accordance with the present invention.

Referring to FIG. 1, in one embodiment a reimbursement system 10 includes a card authorization terminal 12 that is in communication with a billing server 14. The card authorization terminal ("CAT") 12, such as those manufactured by VeriFone, Inc., is a device for reading information stored on cards, such as credit cards having magnetically-encoded strips, and transmitting that information to the billing server 14. Information read from cards typically includes an identifier that identifies a financial account, such as a credit card account identifier read from the magnetically-encoded strip, and a transaction amount, such as a purchase price. The CAT 12 is used with such cards in adjusting the balance of the corresponding financial account of the cards.

In a credit card account, the balance is typically an amount of debt, with the balance increasing and decreasing as amounts of debits and credits respectively are applied to the credit card account. In a debit card account, the balance is typically an amount of funds available, and the balance can increase and decrease as amounts of credits and debits respectively are applied to the debit card account. For example, the card may be used during a transaction to apply an amount of debit to the financial account, such as when a purchase is paid for using the financial account. The card may also be used during a transaction to apply an amount of credit to the financial account, such as when merchandise is returned and a refund for the merchandise is applied to the financial account. As used herein, "applying a charge amount" and "charging" each mean applying a debit amount to a financial account.

The billing server 14 is a computing device that is controlled by or on behalf of a billing party, which is typically an issuer of the financial account. The billing server 14 receives the information transmitted by the CAT 12, and may adjust the indicated financial account by the indicated amount. The billing server 14 in turn transmits to the CAT 12 an indication that the financial account has been adjusted. For example, during a transaction a typical card authorization terminal may receive an authorization code for the transaction, in which the authorization code indicates that a requested debit amount has been applied to the financial account and therefor the transaction has been authorized.

Figure 2:
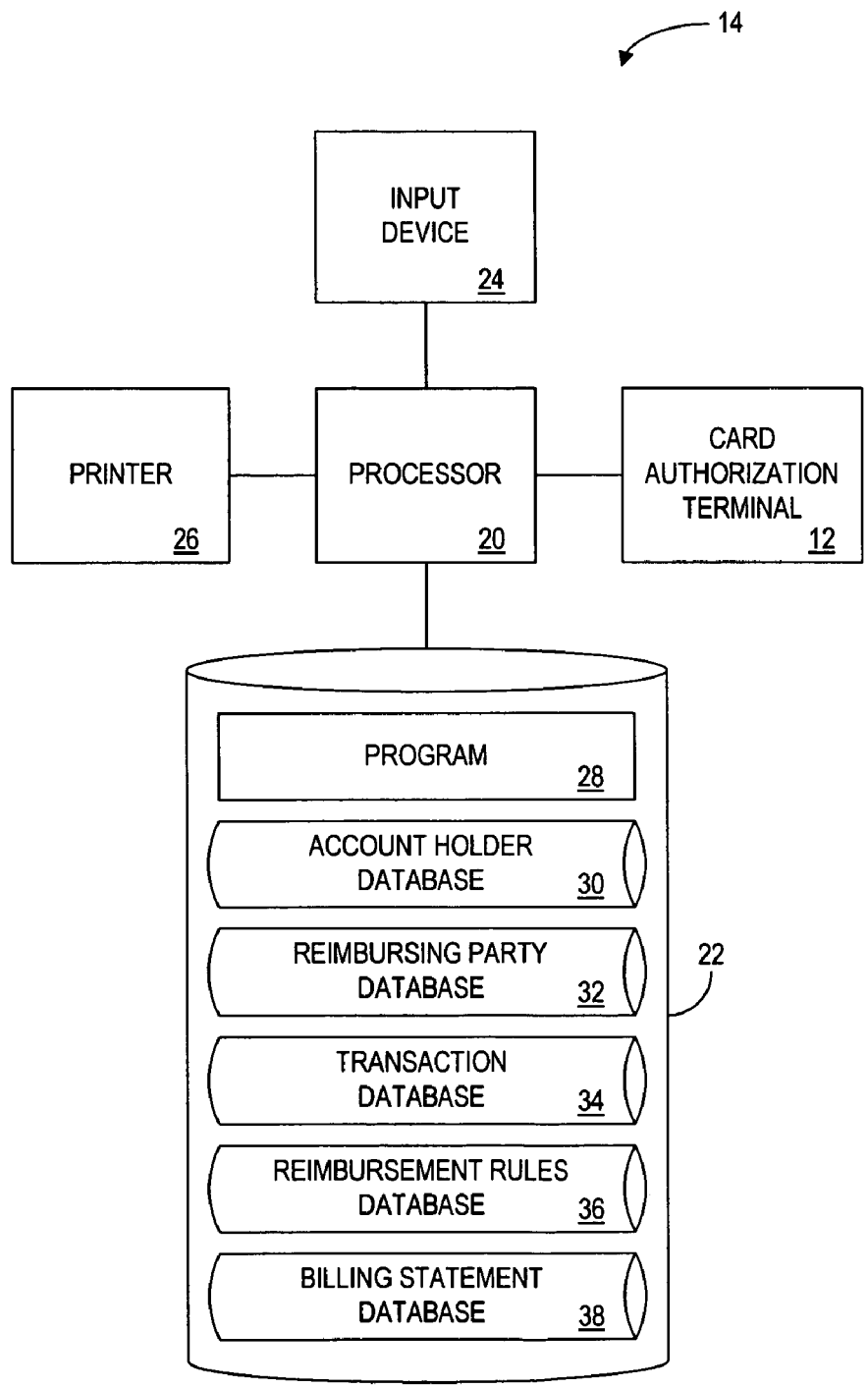
FIG. 2 is a schematic illustration of a billing server of the reimbursement system of FIG. 1.

Referring to FIG. 2, the billing server 14 comprises a processor 20, such as one or more conventional microprocessors. The processor 20 is in communication with a data storage device 22, such as an appropriate combination of magnetic, optical and/or semiconductor memory. The processor 20 and the storage device 22 may each be (i) located entirely within a single computer or other computing device; (ii) connected to each other by a remote communication medium, such as a serial port cable, telephone line or radio frequency transceiver; or (iii) a combination thereof. For example, the billing server 14 may comprise one or more computers that are connected to a remote server computer for maintaining databases.

An input device 24 and a printer 26 are each in communication with the processor 20. The input device 24 may comprise a keypad for transmitting input signals, such as signals representative of operator commands, to the processor 20. The printer 26 is for registering indicia on paper or other material, thereby printing billing statements as commanded by the processor 20. Many types of input devices and printers are known to those skilled in the art, and need not be described in detail herein.

The storage device 22 stores a program 28 for controlling the processor 20. The processor 20 performs instructions of the program 28, and thereby operates in accordance with the present invention, and particularly in accordance with the methods described in detail herein. The program 28 furthermore includes program elements that may be necessary, such as an operating system and "device drivers" for allowing the processor 20 to interface with computer peripheral devices, such as the input device 24 and the printer 26. Appropriate device drivers and other necessary program elements are known to those skilled in the art, and need not be described in detail herein.

The storage device 22 also stores (i) an account holder database 30; (ii) a reimbursing party database 32; (iii) a transaction database 34; (iv) a reimbursement rules database 36; and (v) a billing statement database 38. The databases 30, 32, 34, 36 and 38 are described in detail below and depicted with exemplary entries in the accompanying figures. As will be understood by those skilled in the art, the schematic illustrations of, and accompanying descriptions of the databases presented herein are exemplary arrangements for stored representations of information. A number of other arrangements may be employed besides the tables shown. In addition, information which is illustrated as being stored in one database may be stored in one or more other databases. Similarly, the illustrated entries represent exemplary information, but those skilled in the art will understand that the number and content of the entries can be different from those illustrated herein.

In the description below, financial accounts which are credit card accounts are described and used in conjunction with the present invention. Those skilled in the art will understand that the present invention is equally applicable to other types of financial accounts, such as debit card accounts or stored value cards such as "smart cards".

Referring to FIG. 3, a table 50 illustrates an embodiment of the account holder database 30 (FIG. 2). The table 50 includes entries 52, 54, 56, 58, 60 and 62, each of which describes a party to be reimbursed that has a financial account with the billing party. Such a party to be reimbursed is also referred to herein as an "account holder". It will be understood by those skilled in the art that the table 50 may include any number of entries. Each of the entries 52, 54, 56, 58, 60 and 62 defines (i) an account identifier 64 for uniquely indicating the financial account; (ii) an account holder name 66; (iii) an account holder billing address 68; (iv) a maximum balance 70; and (v) an available balance 72. The maximum balance 70 is the maximum balance allowed on the financial account at any time. Similarly, the available balance 72 is the difference between the maximum balance and the current balance of the financial account. For example, referring to the entry 54, the financial account identified by "1111-1122-2222-2222" has a $7,000 maximum balance and a $3,000 available balance. Accordingly, the current balance of the financial account identified by "1111-1122-2222-2222" is $4,000 ($7,000−$3,000=$4,000). As will be apparent to those skilled in the art, further information, such as account holder telephone numbers, may be stored for each account holder.

Referring to FIG. 4, a table 80 illustrates an embodiment of the reimbursing party database 32 (FIG. 2). The table 80 includes entries 82, 84, 86 and 88, each of which describes a reimbursing party (a party that has agreed to pay the billing party for at least portions of certain transactions initiated by a party to be reimbursed). It will be understood by those skilled in the art that the table 80 may include any number of entries. Each of the entries 82, 84, 86 and 88 defines (i) a reimbursing party identifier 90 for uniquely indicating the reimbursing party; (ii) a reimbursing party descriptor 92 for describing the name of the reimbursing party, or other information identifying the reimbursing party; and (iii) a total amount due 94 which indicates the total amount that the reimbursing party has agreed to pay the billing party but has not yet paid. A reimbursing party may have agreed to pay for many transactions initiated by a party to be reimbursed. Similarly, a reimbursing party may have agreed to pay for transactions initiated by many parties to be reimbursed. Accordingly, the total amount due 94 may be a sum of several payments that are due. As will be apparent to those skilled in the art, further information, such as a detailed breakdown of the amounts the reimbursing party has agreed to pay and the account identifiers of the corresponding parties to be reimbursed, may be stored for each reimbursing party.

Each reimbursing party has agreed to pay the billing party for at least portions of certain charges initiated by a party to be reimbursed. The billing party maintains a record of how much each reimbursing party owes the billing party. The billing party may also periodically send a bill to each reimbursing party or otherwise notify each reimbursing party how much is owed. Accordingly, the billing party maintains a financial account for each reimbursing party. Such a financial account of the reimbursing party may be uniquely identified by the reimbursing party identifier 90, or alternatively by another identifier. The financial account of the reimbursing party may be a credit card account or debit card account with the billing party. However, the financial account of the reimbursing party need not be a card-based financial account. On the contrary, the financial account of the reimbursing party need not be an account which affords the reimbursing party with any spending privileges. The financial account of the reimbursing party may simply be a record of how much is owed to the billing party, and may be a tool for auditing only. The financial account of the reimbursing party has a balance indicating the amount owed, and the balance can increase and decrease as amounts of debits and credits respectively are applied to the financial account.

Referring to FIG. 5, a table 100 illustrates a record included in an embodiment of the transaction database 34 (FIG. 2). The transaction database 34 will typically include a plurality of records, each defining the transactions in which a particular financial account of an account holder was used. The table 100 includes an account identifier 102 that uniquely identifies the financial account, and which corresponds to an account identifier of the account holder database 30 (FIG. 2). In the exemplary record depicted in FIG. 5, the account identifier is "1111-1111-1111-1111", which corresponds to the account identifier of the entry 52 (FIG. 3) of the account holder database 30.

The table 100 also includes entries 104, 106 and 108, each of which describes a transaction in which the financial account was used. It will be understood by those skilled in the art that the table 100 may include any number of entries. Each of the entries 104, 106 and 108 defines (i) a transaction identifier 110 that uniquely indicates the transaction; (ii) a merchant identifier 112 that indicates the merchant that participated in the transaction with the account holder; (iii) a POS identifier 114 that indicates the point-of-sale terminal (if any) used in the transaction; (iv) a transaction date 116 indicating when the transaction occurred; (v) a transaction description 118 that specifies various information regarding the transaction, such as the SIC code of the merchant and/or the name of the merchant; and (vi) the transaction amount 120. As will be apparent to those skilled in the art, further information may be stored for each transaction.

Referring to FIG. 6, a table 130 illustrates a record included in an embodiment of the reimbursement rules database 36 (FIG. 2). The reimbursement rules database 36 will typically include a plurality of records. Each record defines the reimbursement rules for a financial account of an account holder. The table 130 includes an account identifier 132 that uniquely identifies the financial account, and which corresponds to an account identifier of the account holder database 30 (FIG. 2). In the exemplary record depicted in FIG. 6, the account identifier is "1111-1111-1111-1111", which corresponds to the account identifier of the entry 52 (FIG. 3) of the account holder database 30.

The table 130 also includes entries 134, 136, 138 and 140, each of which describes a reimbursement rule. It will be understood by those skilled in the art that the table 130 may include any number of entries. Each of the entries 134, 136, 138 and 140 defines (i) a reimbursing party identifier 142 that uniquely indicates a reimbursing party, and which corresponds to a reimbursing party identifier 90 (FIG. 4) of the reimbursing party database 32; (ii) a reimbursement condition 144; (iii) a reimbursement amount 146; (iv) a billing destination 148 indicating where a bill is to be sent; (v) a time to reimburse 150; (vi) an account alias 152; and (vii) an allowed frequency of reimbursable transactions 154. As will be apparent to those skilled in the art, further information may be stored for each reimbursement rule.

Each reimbursement rule indicates how a transaction amount is apportioned among a plurality of financial accounts, such as among an account of a reimbursing party and an account of a party to be reimbursed. In the above-described embodiment, each reimbursement rule specifies a reimbursement amount, which is at least a portion of an account holder's transaction amount to be paid by the reimbursing party if the transaction satisfies the reimbursement condition. Some representative conditions are illustrated in FIG. 6 and described below.

One reimbursement condition may be that a particular merchant participates in the transaction. For example, the entry 134 has a condition that is satisfied if the merchant that participated in the transaction is "Joe's Office Supplies". As described above, the merchant may be indicated by the merchant identifier 112 (FIG. 5) of the transaction database 34. Thus, it would be determined whether the merchant identifier from indicated reimbursement rule of the reimbursement rules database 36 corresponds to the merchant identifier of the transaction database 34.

Another reimbursement condition may be that the merchant participating in the transaction belongs to a particular category, such as may be indicated by an SIC code. For example, the entry 136 has a condition that is satisfied if the merchant that participated in the transaction is a restaurant.

Another reimbursement condition may be that the transaction indicate that a certain item or type of item is purchased. For example, the CAT 12 (FIG. 1) may use the MasterCard Purchasing Card Level III protocol to transmit data identifying the items purchased to the billing server 14 (FIG. 1).

Another reimbursement condition may be that the transaction amount is (i) within a predetermined range, (ii) less than a predetermined amount, or (iii) equal to a predetermined amount. For example, one reimbursement condition may be that the transaction amount is less than $100.

Those skilled in the art will realize that a condition may comprise two or more conditions that are connected by Boolean operations, such as "AND", "OR" and "NOT". For example, a condition may be satisfied if the merchant that participated in the transaction is "Joe's Office Supplies" and the transaction amount is less than $100.

Some reimbursement rules may specify that any transaction satisfies the reimbursement condition. Accordingly, all transactions using the corresponding financial account would be reimbursed if no other restrictions are imposed. For example, the entry 140 has a condition that is always satisfied.

The reimbursement amount may be a specified amount (e.g. $10), a variable amount (e.g. the transaction amount), or a fixed portion (e.g. 10% of the transaction amount). The reimbursement amount may further be subject to a specified maximum amount, such as "transaction amount, up to $100" or "10% of the transaction amount, up to $30". The reimbursement amount may be based on past transactions. For example, the reimbursement amount may be 90% of the portion of the transactions of the year that exceed $1000. In some embodiments, the reimbursement amount may be determined by a specified "function code", as disclosed in commonly-owned U.S. application Ser. No. 08/883,308, entitled "SYSTEM AND METHOD FOR ESTABLISHING AND EXECUTING FUNCTIONS TO AFFECT CREDIT CARD ACCOUNTS AND TRANSACTIONS", filed on Jun. 26, 1997, incorporated by reference. For example, the reimbursement amount may be determined by a function code (also known as a "POS code") which indicates a $10 reimbursement by the reimbursing party. Such POS codes may be advantageously used by a merchant to provide customers with discounts. Ideally, a corresponding reimbursement condition is that the merchant participate in the transaction. Thus, the reimbursement amount is only provided when the customer conducts a transaction with the merchant.

Each reimbursement rule also specifies a time within which the reimbursing party must remit payment to the billing party. Such a time to reimburse is typically measured from the time that a corresponding billing statement is sent to the reimbursing party. The time to reimburse may also be measured from the time of the transaction. If the reimbursing party does not remit payment to the billing party in time, then the amount that was to be paid by the reimbursing party is typically charged to the account holder. In such a situation, the account holder is ultimately liable for paying debt accrued on the financial account. In other embodiments, the account holder is not liable for paying such debt. Accordingly, if the reimbursing party does not remit payment in time, the billing party may take steps to collect such payment from the reimbursing party.

The allowed frequency of reimbursable transactions 154 of a reimbursement rule specifies how often a transaction amount may be reimbursed according to the reimbursement rule. For example, the entry 134 specifies that a transaction may be reimbursed according to this reimbursement rule once only, the entry 136 specifies that transactions may be reimbursed according to this reimbursement rule twice per week; and the entry 138 specifies that transactions may be reimbursed according to this reimbursement rule any number of times without limit. The entry 140 specifies that a transaction may be reimbursed once, and thus the specified POS code may only be used with one transaction. Those skilled in the art will realize that a reimbursement rule may specify that a POS code is used any number of times.

Each reimbursement rule also specifies an account alias. As is described in further detail below, an account alias is an identifier that corresponds to, but is not identical to, the account identifier 132. Such an account alias may be provided on the billing statement that is sent to the reimbursing party, thereby allowing the reimbursing party to identify the party to be reimbursed without knowing his credit card account identifier.

Figure 7:
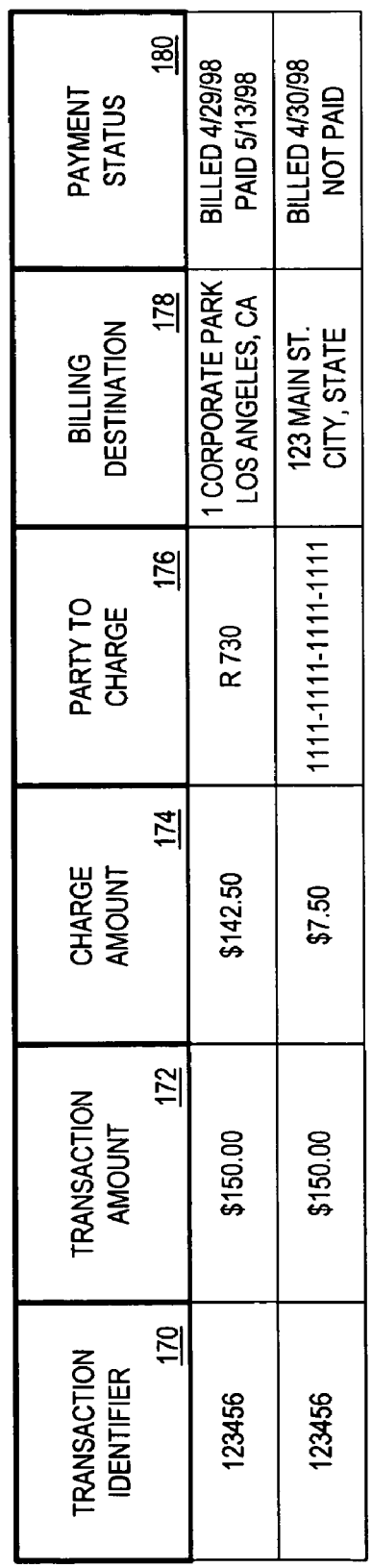
FIG. 7 is a schematic illustration of an exemplary record of a billing statement database of the billing server of FIG. 2.

Referring to FIG. 7, a table 160 illustrates an embodiment of the billing statement database 38 (FIG. 2). The table 160 includes entries 162 and 164, each of which describes information to appear on a billing statement. It will be understood by those skilled in the art that the table 160 may include any number of entries. Each of the entries 162 and 164 defines (i) a transaction identifier 170 that uniquely indicates a transaction that is to appear on a billing statement, and that corresponds to a transaction identifier 110 (FIG. 5) of the transaction database 34; (ii) a transaction amount 172 indicating the amount of the transaction; (iii) a charge amount 174 which indicates a portion of the transaction amount 172 that is applied to a financial account; (iv) a party to charge 176 which indicates a party to pay the charge amount 174; (v) a billing destination 178 that indicates a destination (if any) to which the corresponding billing statement is sent; and (vi) a payment status 180 indicating whether and/or when a bill has been sent to the indicated party, and whether and/or when payment for the charge amount 174 has been received by the billing party. As will be apparent to those skilled in the art, further information may be stored for each entry.

The party to charge 176 is an identifier that corresponds to one of (i) the account identifier 64 (FIG. 3) of the account holder database 30; and (ii) the reimbursing party identifier 90 (FIG. 4) of the reimbursing party database 32. Thus, the party to charge 176 indicates an account holder or a reimbursing party. Similarly, the billing destination 178 corresponds to one of (i) the account holder billing address 68 (FIG. 3) of the account holder database 30; and (ii) the billing destination 148 (FIG. 6) of the reimbursing party database 32. Thus, further information regarding a party to charge or a billing destination may be readily determined from databases described above.

In accordance with entries of the billing statement database 38, billing statements may be printed on the printer 26 (FIG. 2) as appropriate. For example, if a billing destination indicates a postal address, a billing statement may be printed and mailed to the postal address. Billing statements may also be transmitted via a network, such as the Internet. For example, if a billing destination indicates an electronic mail address, a billing statement may be generated and sent to the electronic mail address.

Figure 8:
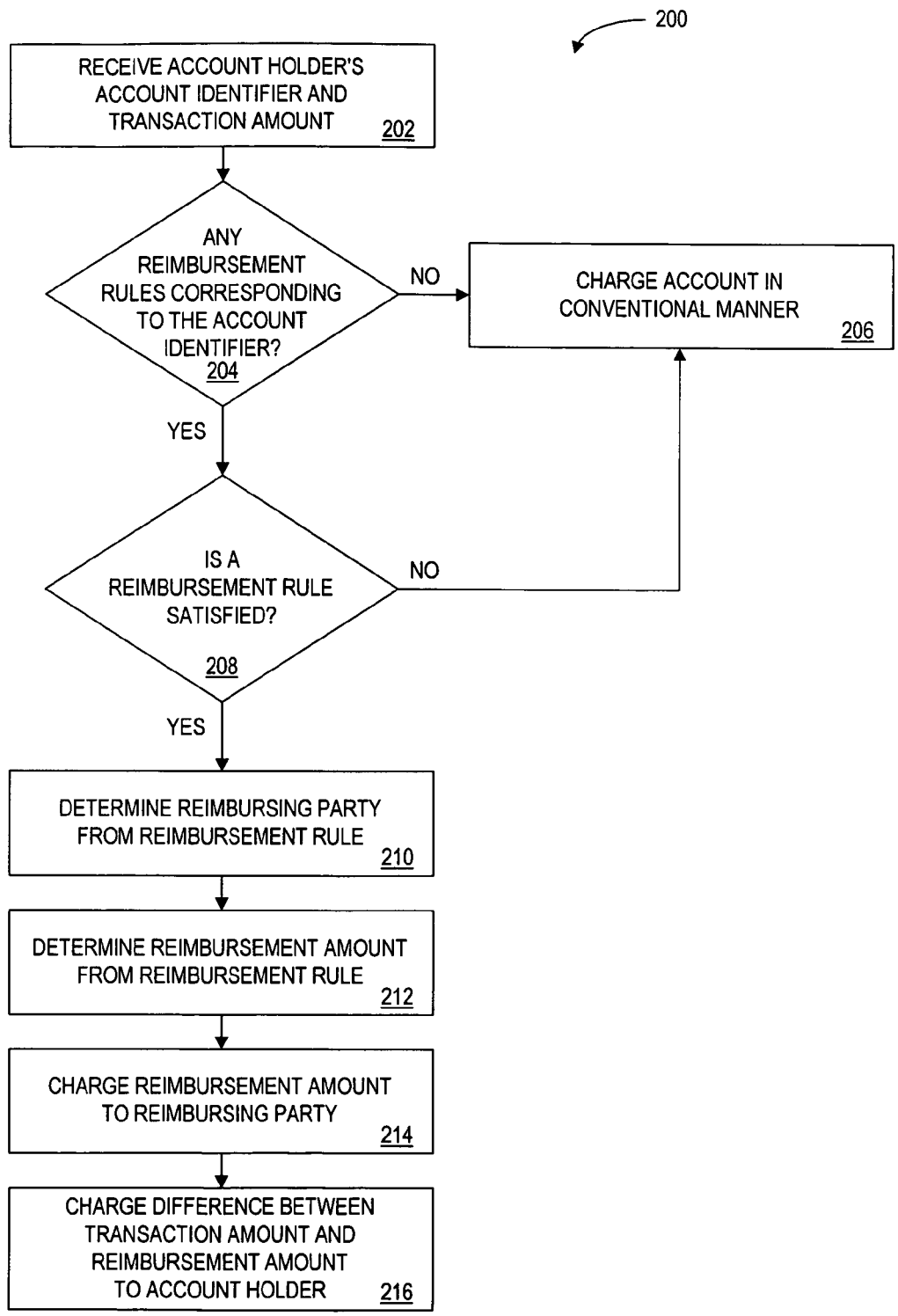
FIG. 8 is a flowchart illustrating a method for processing a charge applied to a financial account.

Referring to FIG. 8, a process 200 performed by the billing server 14 (FIG. 1) initiates when charge data is received (step 202) from the CAT 12 processing a transaction. The charge data typically includes a transaction amount and an account identifier that specifies an account holder's financial account. The charge data may further include a merchant identifier that uniquely identifies the merchant. Upon receiving the charge data, the billing server 14 may generate a transaction identifier that uniquely identifies the transaction. Alternatively, the charge data may include a transaction identifier. The charge data and transaction identifier are stored in the transaction database 34.

The billing server 14 then determines whether there are any reimbursement rules corresponding to the account identifier (step 204); and thus determines whether there are any reimbursement rules corresponding to the financial account. For example, the received account identifier may be compared with records of the reimbursement rules database 36 to find a record that includes the account identifier. For example, the table 130 (FIG. 6) represents a record that includes an account identifier "1111-1111-1111-1111".

If there are not any reimbursement rules corresponding to the financial account, then the account holder's financial account is charged in a conventional manner with the transaction amount (step 206). If there are reimbursement rules corresponding to the financial account, then the billing server 14 determines whether any of the reimbursement rules are satisfied (step 208). As described above, each record of the reimbursement rules database 36 includes one or more entries. Each entry describes a reimbursement rule and includes a reimbursement condition. A reimbursement rule is satisfied if the corresponding reimbursement condition is satisfied by the transaction.

If a reimbursement rule is satisfied, the reimbursing party corresponding to that reimbursement rule is determined (step 210). Thus, if an entry includes a reimbursement condition that is satisfied by the transaction, then the reimbursing party is determined from the reimbursing party identifier of the entry. Similarly, a reimbursement amount is also determined from the satisfied reimbursement rule (step 212).

The reimbursement amount is charged to the reimbursing party (step 214). Charging the reimbursing party may comprise generating an entry for insertion into the billing statement database 38 (FIG. 2). Such an inserted entry would include (i) the transaction identifier generated by the billing server 14, (ii) the transaction amount received in step 202, (iii) a charge amount which is the reimbursement amount determined in step 212; (iv) the party to charge, which is the reimbursing party; and (v) the billing destination which is determined with reference to the billing destination 148 (FIG. 6) of the appropriate entry in the reimbursement rules database 36.

The difference between the transaction amount and the reimbursement amount is likewise charged to the account holder (step 216). Charging the account holder may comprise generating an entry for insertion into the billing statement database 38 (FIG. 2). Such an inserted entry would include (i) the transaction identifier generated by the billing server, (ii) the transaction amount received in step 202, (iii) a charge amount which is the difference between the transaction amount and the reimbursement amount determined in step 212; (iv) the party to charge, which is the account holder and may be identified by the account identifier received in step 202; and (v) the billing destination which is determined with reference to the account holder billing address 68 (FIG. 3) of the appropriate entry in the account holder database 30.

In one embodiment, the available balance of the account holder may be compared with the difference between the transaction amount and the reimbursement amount. If the account holder does not have a sufficient available balance, then the charge would be denied.

For example, referring again to FIG. 5, the entry 106 of the transaction database 34 defines the transaction identified by the transaction identifier "123456", and also indicates that the transaction amount is $150. Further, the SIC code of the merchant indicates that the merchant is a "medical care provider". Referring again to FIG. 6, shown therein are the reimbursement rules applicable to the appropriate account holder. Particularly, the entry 138 indicates that 95% of the transaction amount is to be reimbursed by the reimbursing party "R730" if the merchant participating in the transaction is a medical care provider. Since the transaction "123456" identified above satisfies this reimbursement condition, reimbursement is to be made and thus the reimbursing party "R730" is to be charged accordingly. Referring again to FIG. 7, the entries 162 and 164 of the billing statement database 38 correspond to the transaction "123456" which has resulted in charges to two financial accounts. The transaction amount $150 is reflected in each of the entries 162 and 164. The charge amount for the party identified by "R730" is $142.50 (95% of the transaction amount). The charge amount for the party identified by "1111-1111-1111-1111" is $7.50 ($150.00–$142.50).

The above-described process 200 may be performed during the time that a transaction is initiated and concludes at the CAT 12. Alternatively, steps of the process 200 may be performed some time after the transaction has concluded. For example, the billing server 14 may determine, on a monthly basis, whether any transaction described in the transaction database 34 (FIG. 2) should be reimbursed, as described above. If so, the appropriate reimbursing parties would be charged accordingly.

In the description above, a plurality of financial accounts could each be charged portions of a transaction amount based on whether the transaction satisfied rules stored by the billing server 14 (FIGS. 1 and 2). In other embodiments, a plurality of financial accounts could be charged portions of a transaction amount based on whether authorization is received from the reimbursing party or another party. As will be apparent to those skilled in the art, the reimbursement rules database may define both reimbursement rules that do not require approval, and reimbursement rules that do.

Figure 9:
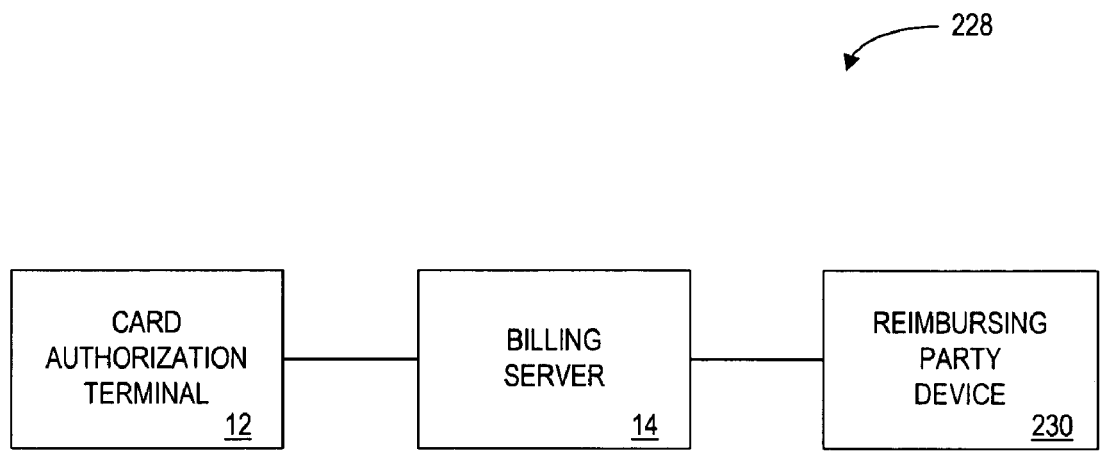
FIG. 9 is a schematic illustration of another embodiment of a reimbursement system provided in accordance with the present invention.

Referring to FIG. 9, in another embodiment a reimbursement system 228 includes the billing server 14 that is in communication with the card authorization terminal 12 and with a reimbursing party device 230. The reimbursing party device 230 may be a computer, telephone or other device that may receive an approval request from the billing server 14 and transmit a response to the billing server 14.

Referring to FIG. 10, a table 240 illustrates a record included in another embodiment of the reimbursement rules database 36 (FIG. 2). Each record defines the reimbursement rules for a particular financial account. The table 240 includes an account identifier 242 that uniquely identifies the financial account, and which corresponds to an account identifier of the account holder database 30 (FIG. 2). In the exemplary record depicted in FIG. 10, the account identifier is "1111-1111-1111-1111", which corresponds to the account identifier of the entry 52 (FIG. 3) of the account holder database 30.

The table 240 also includes entries 244, 246, 248 and 250, each of which describes a reimbursement rule. It will be understood by those skilled in the art that the table 240 may include any number of entries. Each of the entries 244, 246, 248 and 250 defines (i) a reimbursing party identifier 252 that uniquely indicates a reimbursing party, and which corresponds to a reimbursing party identifier 90 (FIG. 4) of the reimbursing party database 32, (ii) a reimbursement condition 254; (iii) a communication address for approval request 256; (iv) a reimbursement amount 258; (v) a billing destination 260; (vi) time to reimburse 262; and (vii) an account alias 264. As will be apparent to those skilled in the art, further information may be stored for each reimbursement rule.

Contrary to the embodiment illustrated in FIG. 6, in the embodiment illustrated in FIG. 10 reimbursement rules indicate a communication address to which a request for approval is sent if the transaction satisfies the corresponding reimbursement condition. For example, the entry 244 indicates that a request for approval is sent to the electronic mail address "finance@corpx.com". The entry 246 similarly indicates that a request for approval is communicated to the telephone number "(203) 555-1234". Telephone numbers may permit a request for approval to be sent to a facsimile machine, to a live operator or to an interactive voice-response unit.

The reimbursing party device 230 (FIG. 9) receives the request for approval, and in turn sends to the billing server 14 a response to the request for approval. If the response indicates that the reimbursing party has approved the request, then the reimbursing party is charged the reimbursement amount specified by the reimbursement rule. The received response indicates approval or rejection (e.g. a "yes" or "no" response), and may also indicate further information, such as (i) a financial account from which funds may be transferred to the billing party, or (ii) other information typically included in the reimbursement rules database 36 (FIG. 2), such as a reimbursement amount. If the response indicates a financial account from which funds may be transferred to the billing party, then funds may be transferred automatically, and consequently the reimbursement amount is paid.

In some embodiments, the response may also include an indication of the reimbursement amount to be charged to the reimbursing party. In such embodiments, a reimbursement amount need not be stored in the corresponding entry of the reimbursement rules database 36. The response may also include bearer instrument that is a form of "digital money", also known as "e-cash". Digital money is typically an encrypted digital file containing a list of digital representations of specified amounts of money, each recorded by an issuing bank. A description of different types of "digital money" may be found in "Digital Money, The New Era of Internet Commerce", by Daniel C. Lynch and Leslie Lundquist, and in "Electronic Payment Systems", by Donald O'Mahony, Michael Peirce and Hitesh Tewari. In such an embodiment, not only is the reimbursement amount indicated by the received response, but the payment itself is received in the response, so the reimbursing party does not need to be charged for the reimbursement amount.

Figure 11A:
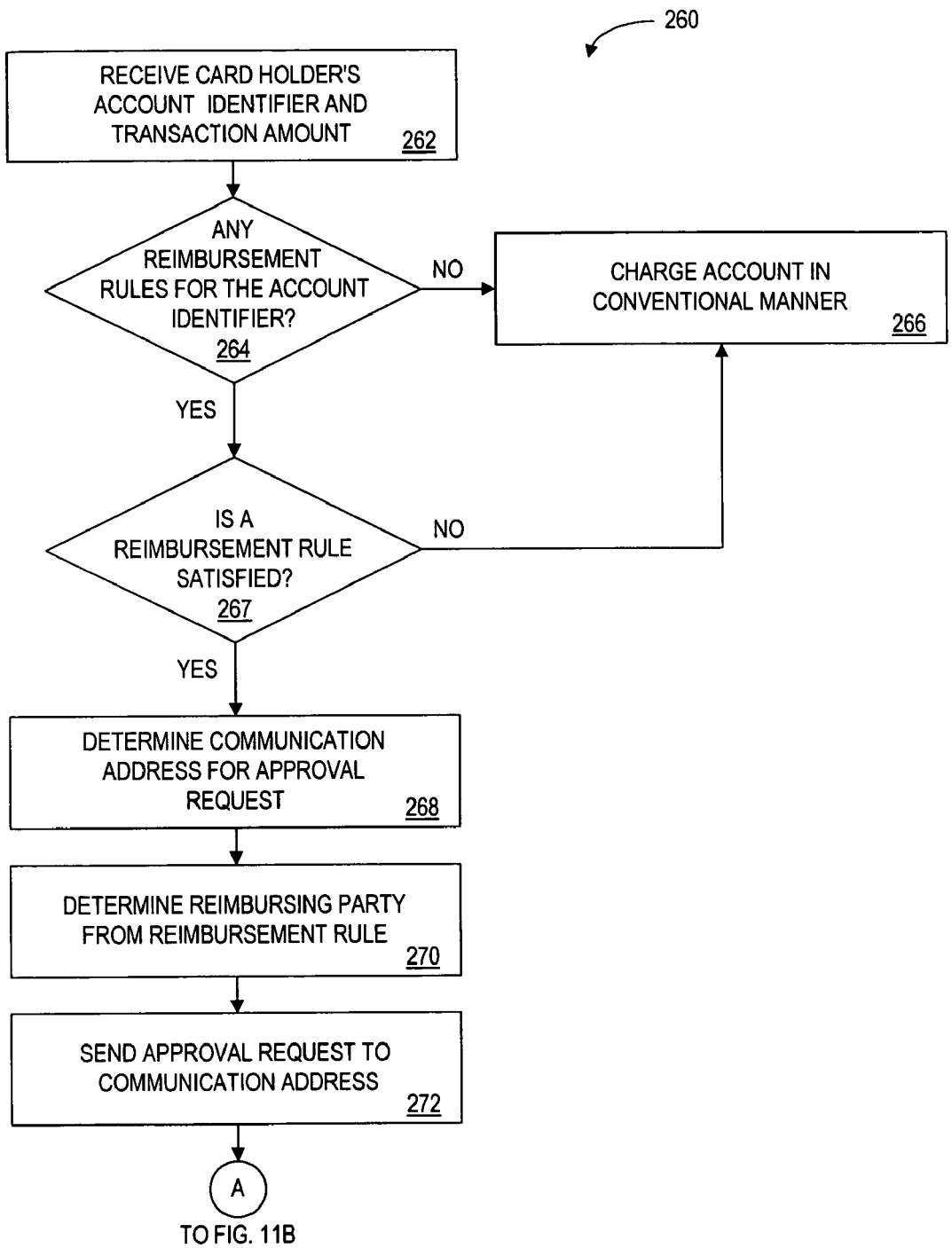
FIGS. 11A and 11B are a flowchart illustrating another method for processing a charge applied to a financial account.
Figure 11B:
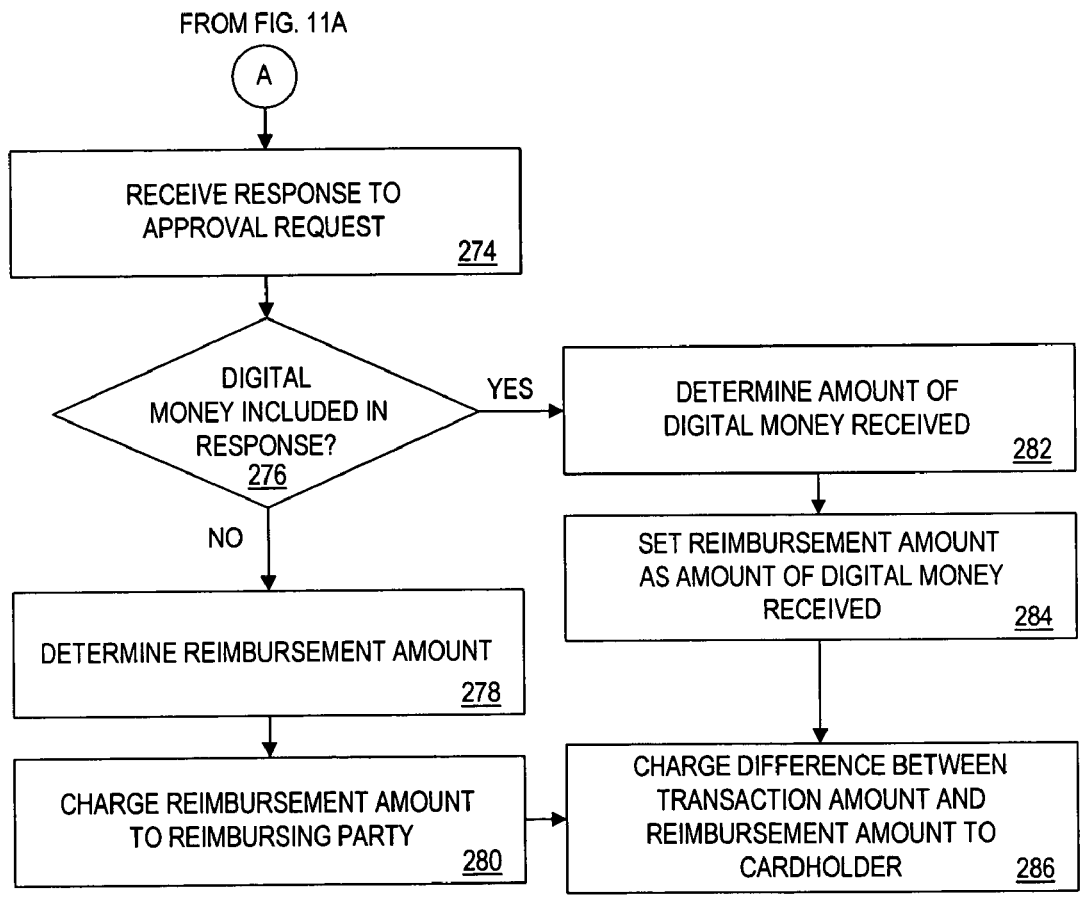

Referring to FIGS. 11A and 11B, a process 260 performed by the billing server 14 (FIG. 1) initiates when charge data is received (step 262) from the CAT 12 processing a transaction. The charge data typically includes a transaction amount and an account identifier that specifies an account holder's financial account. Upon receiving the charge data, the billing server 14 may generate a transaction identifier that uniquely identifies the transaction. Alternatively, the charge data may include the transaction identifier. The billing server 14 then determines whether there are any reimbursement rules corresponding to the account identifier (step 264), and thus determines whether there are any reimbursement rules corresponding to the financial account. For example, the received account identifier may be compared with records of the reimbursement rules database 36 to find a record that includes the account identifier.

If there are not any reimbursement rules corresponding to the financial account, then the account holder's financial account is charged in a conventional manner with the transaction amount (step 266). If there are reimbursement rules corresponding to the financial account, then the billing server 14 determines whether any of the reimbursement rules are satisfied (step 267). As described above, each record of the reimbursement rules database 36 includes one or more entries. Each entry describes a reimbursement rule and includes a reimbursement condition. A reimbursement rule is satisfied if the corresponding reimbursement condition is satisfied by the transaction.

If a reimbursement rule is satisfied, the communication address and reimbursing party corresponding to that reimbursement rule are determined (steps 268 and 270, respectively). Thus, if an entry includes a reimbursement condition that is satisfied by the transaction, then the communication address and reimbursing party are determined from the reimbursing party identifier of the entry.

The billing server 14 sends a request for approval to the communication address (step 272), and a response thereto is received (step 274). If it is determined that digital money is not included in the response (step 276), then the reimbursement amount is otherwise determined (e.g., from the response or reimbursement rules database 36) (step 278). The reimbursement amount is charged to the reimbursing party (step 280). If digital money is included in the response, then the amount of digital money is determined (step 282), and the reimbursement amount is set to be this digital money amount (step 284). The difference between the transaction amount and the reimbursement amount is charged to the account holder (step 286).

In another embodiment, the charge data received from the CAT 12 may include a signal that indicates approval to charge at least a portion of the transaction amount to a second financial account. In such an embodiment, the billing server would not send a request for approval to a communication address, since approval has already been received.

Referring to FIG. 12, a table 280 represents other exemplary information included in the billing statement database 38. The table 280 includes entries 282 and 284 that correspond to a transaction identified by the transaction identifier "987654". Referring again to FIG. 5, the entry 104 of the transaction database 34 defines the transaction identified by the transaction identifier "987654", and also indicates that the transaction amount is $125. Further, the SIC code of the merchant indicates that the merchant is a "restaurant". Referring again to FIG. 10, shown therein are the reimbursement rules applicable to the appropriate account holder. Particularly, the entry 246 indicates that the transaction amount, up to $100, is to be reimbursed by the reimbursing party "R729" if the merchant participating in the transaction is a restaurant. Since the transaction "987654" identified above satisfies this reimbursement condition, reimbursement is to be made and thus the reimbursing party "R729" is to be charged accordingly. Referring again to FIG. 12, the entries 282 and 284 of the billing statement database 38 correspond to the transaction "987654" which has resulted in charges to two financial accounts. The transaction amount $125 is reflected in each of the entries 282 and 284. The charge amount for the party identified by "R729" is $100 (the maximum to be reimbursed according to the entry 246 of FIG. 10). The charge amount for the party identified by "1111-1111-1111-1111" is $25 ($125–$100).

Figure 13:
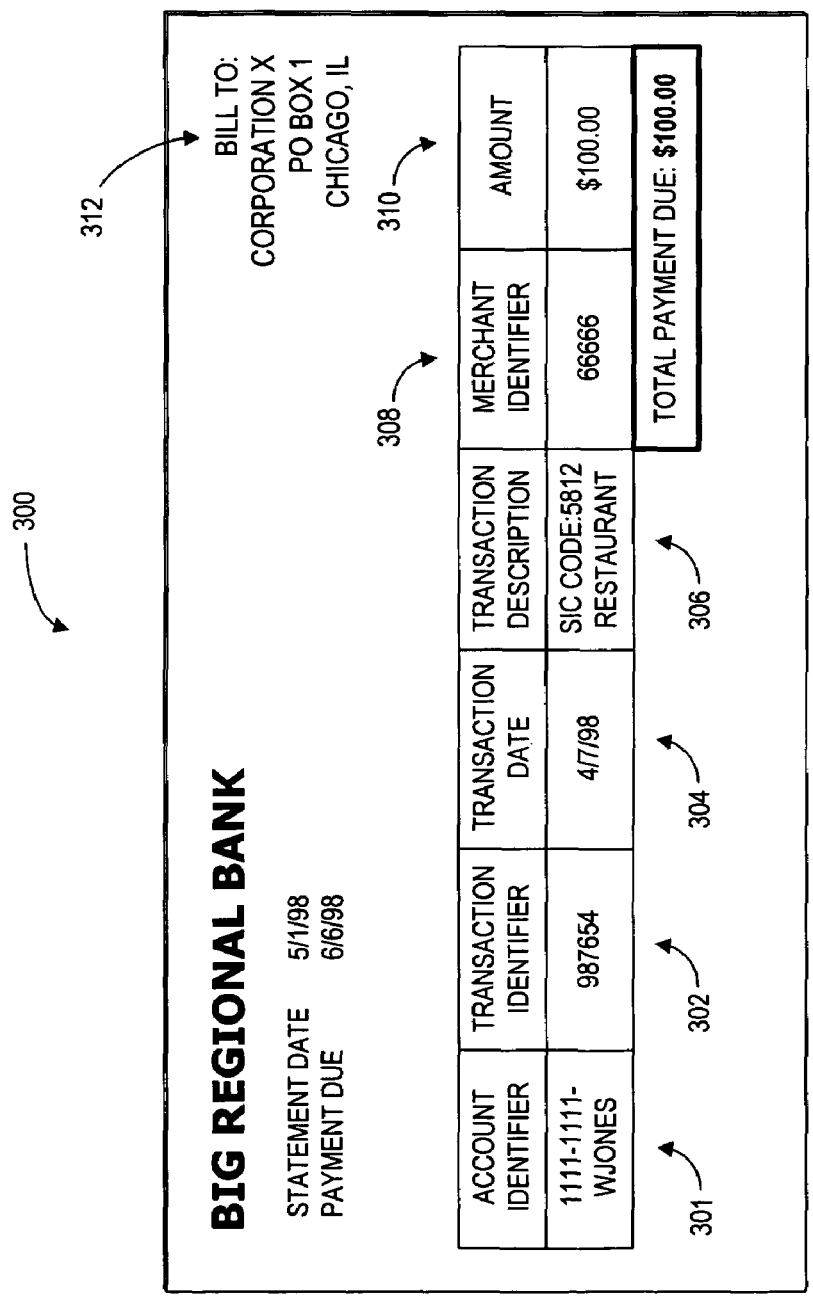
FIG. 13 is a plan view of an exemplary billing statement printed in accordance with the present invention.

FIG. 13 represents an exemplary billing statement 300 printed for the reimbursing party in accordance with the entry 282 (FIG. 12) of the billing statement database 38. Those skilled in the art will understand that a billing statement may include information that differs from the below-described exemplary billing statements. The billing statement 300 includes indicia indicating an account number 301 (which is an account alias), a transaction identifier 302, a transaction data 304, a transaction description 306, a merchant identifier 308, an amount charged 310 and a billing destination 312. The indicia may be printed on the printer 26 (FIG. 2) based on (i) data stored in the billing statement database 38, such as the transaction identifier 170 and the charge amount 174 (FIGS. 7 and 12), (ii) data stored in the transaction database 34, such as the merchant identifier 112, transaction date 116 and the transaction description 118 (FIG. 5), and (iii) data stored in the reimbursement rules database 36, such as the billing destination 148 and the account alias 152.

Figure 14:
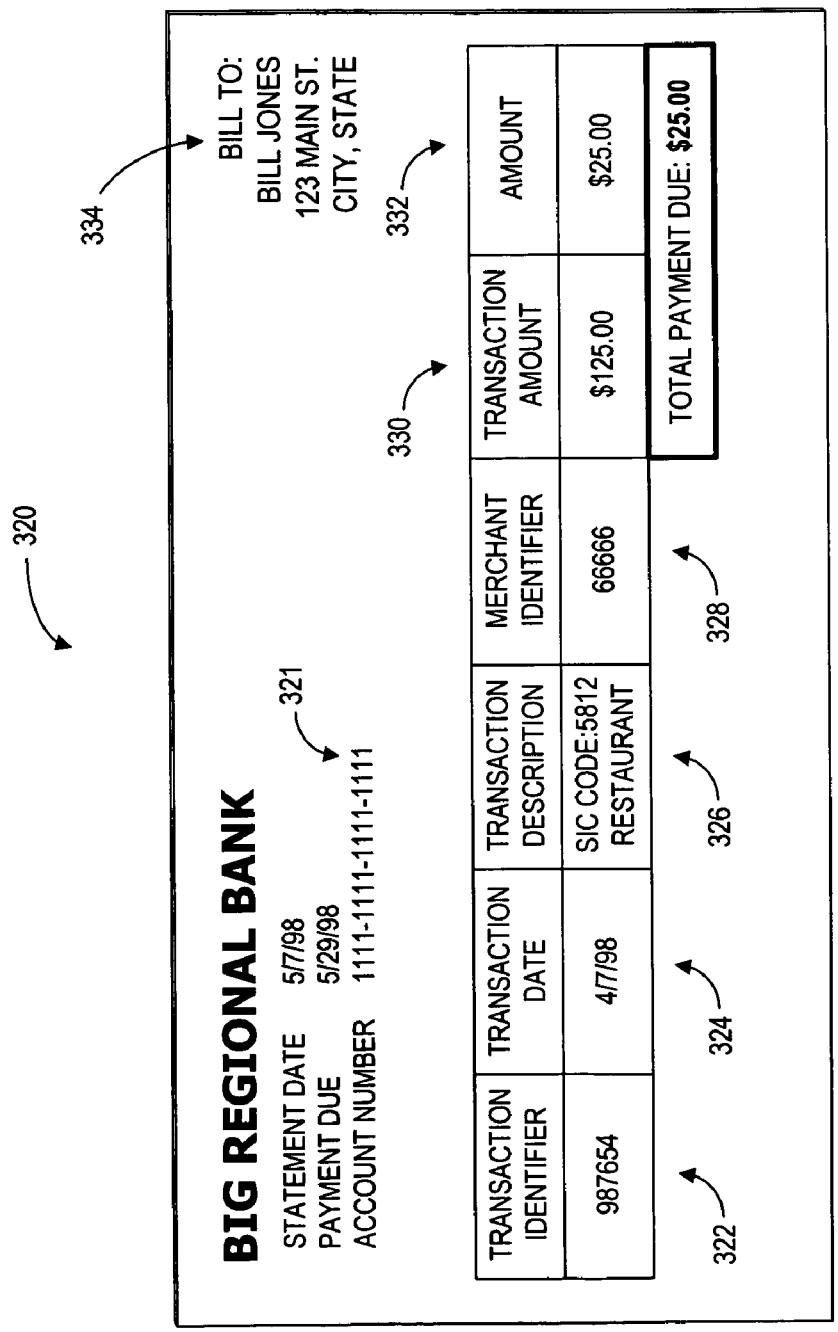
FIG. 14 is a plan view of another exemplary billing statement printed in accordance with the present invention.

FIG. 14 represents an exemplary billing statement 320 printed for the party to be reimbursed in accordance with the entry 284 (FIG. 12) of the billing statement database 38. The billing statement 320 includes indicia indicating the corresponding account identifier 321, transaction identifier 322, transaction date 324, transaction description 326, merchant identifier 328, transaction amount 330, amount charged 332 and billing destination 334. The indicia may be printed on the printer 26 (FIG. 2) based on (i) data stored in the billing statement database 38, such as the transaction identifier 170, transaction amount 172 and the charge amount 174 (FIGS. 7 and 12), (ii) data stored in the transaction database 34, such as the merchant identifier 112, transaction date 116 and the transaction description 118 (FIG. 5), and (iii) data stored in the reimbursement rules database 36, such as the billing destination 148.

As described above, an account alias may be stored for each reimbursement rule. For example, each entry of the reimbursement rules database 36 includes a corresponding account alias 152 (FIG. 6). In another embodiment, each financial account may have a single account alias that is revealed to appropriate reimbursing parties.

Referring to FIG. 15, a table 350 represents an account alias database storing account identifiers 352 and corresponding account aliases 354. In embodiments which use such an account alias database, a party to be reimbursed has a corresponding account alias that is revealed to all appropriate reimbursing parties. The account alias database may be stored in the data storage device 22. In other embodiments, an account alias may be generated by applying a "one-way hash function" to the account identifier, or by otherwise encrypting or encoding the account identifier. Many appropriate cryptographic techniques are described in "Applied Cryptography, Protocols, Algorithms, And Source Code In C", by Bruce Schneier.

Figure 16:
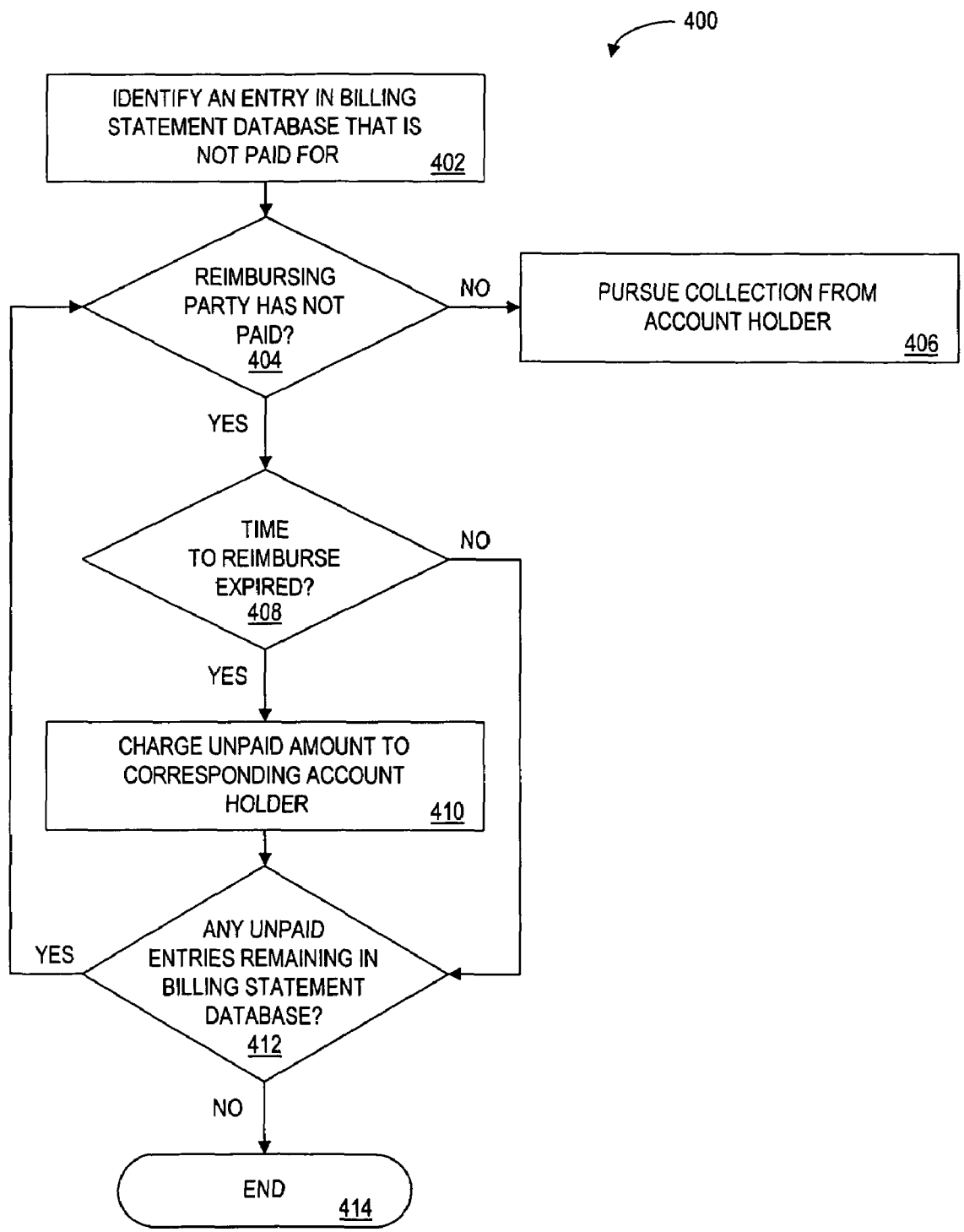
FIG. 16 is a flowchart illustrating another method for processing a charge applied to a financial account.

Referring to FIG. 16, a process 400 is performed by the billing server 14 (FIG. 1) at periodic or predetermined intervals to determine whether any reimbursing parties have not paid the amounts they were charged. The billing server 14 identifies an entry in the billing statement database 38 (FIG. 2) that indicates an unpaid charge (step 402). If it is determined that the entry does not correspond to a reimbursing party (step 404), then the unpaid amount was charged to an account holder, and collection from the account holder is pursued in a conventional manner (step 406). If the entry does correspond to a reimbursing party, then it is also determined whether the time to reimburse has expired (step 408). If so, then the unpaid amount is charged to the corresponding account holder (step 410). The corresponding account holder may be determined from the entry by searching the billing statement database 38 for another entry that indicates the same transaction. Such an embodiment assures that liability for unpaid reimbursement amounts rests with the account holder. As described above, in an alternate embodiment the reimbursing party may be held liable, rather than the corresponding party to be reimbursed. If there are any unpaid entries remaining in the billing statement database 38 (step 412), then the above-described steps are repeated. When no unpaid entries remain, the process 400 ends (step 414).

Although the present invention has been described with respect to a preferred embodiment thereof, those skilled in the art will note that various substitutions may be made to those embodiments described herein without departing from the spirit and scope of the present invention. For example, the present invention is applicable to debit card accounts as well as credit card accounts. In addition, an account holder may be reimbursed by more than one reimbursing party.

What is claimed is:

1. A method for processing a charge applied to a credit card account, the method comprising:
   receiving charge data via a card authorization terminal,
   in which the charge data includes:
   an indication of a transaction amount,
   an indication of a merchant, and
   an indication of a credit card account of an account holder;
   determining, by a billing server in communication with the card authorization terminal, a reimbursement rule that is associated with the credit card account,
   in which the reimbursement rule indicates:
   a reimbursement condition,
   a reimbursing party, and
   a period of time for the reimbursing party to remit payment;
   determining, by the billing server, whether the charge data satisfies the reimbursement rule based on the reimbursement condition and the indication of the merchant; and
   if the charge data satisfies the reimbursement rule, performing by the billing server the following:
   determining a reimbursement amount based on the reimbursement rule and the charge data;
   determining a first charge amount based on a difference between the transaction amount and the reimbursement amount;
   applying the first charge amount to the credit card account;
   determining a second charge amount based on the reimbursement amount, determining a financial account of the reimbursing party;
   transmitting a billing statement for the financial account to the reimbursing party,
   in which the billing statement includes an indication of the second charge amount;
   determining whether the reimbursing party has remitted a payment of the second charge amount within the period of time for the reimbursing party to remit payment; and
   applying the second charge amount to the credit card account if the reimbursing party has not remitted a payment of the second charge amount within the period of time for the reimbursing party to remit payment.

2. A method for processing a charge applied to a debit card account, the method comprising:
   receiving charge data via a card authorization terminal,
   in which the charge data includes:
   an indication of a transaction amount,
   an indication of a merchant, and
   an indication of a debit card account of an account holder;
   determining, by a billing server in communication with the card authorization terminal, a reimbursement rule that is associated with the debit card account,
   in which the reimbursement rule indicates:
   a reimbursement condition,
   a reimbursing party, and
   a period of time for the reimbursing party to remit payment;
   determining, by the billing server, whether the charge data satisfies the reimbursement rule based on the reimbursement condition and the indication of the merchant; and
   if the charge data satisfies the reimbursement rule, performing by the billing server the following:
   determining a reimbursement amount based on the reimbursement rule and the charge data;
   determining a first charge amount based on a difference between the transaction amount and the reimbursement amount;
   applying the first charge amount to the debit card account;
   determining a second charge amount based on the reimbursement amount, determining a financial account of the reimbursing party;
   transmitting a billing statement for the financial account to the reimbursing party,
   in which the billing statement includes an indication of the second charge amount;
   determining whether the reimbursing party has remitted a payment of the second charge amount within the period of time for the reimbursing party to remit payment; and
   applying the second charge amount to the debit card account if the reimbursing party has not remitted a payment of the second charge amount within the period of time for the reimbursing party to remit payment.

3. A method for processing a charge applied to a credit card account, the method comprising:
   receiving charge data via a card authorization terminal,
   in which the charge data includes:
   an indication of a transaction amount,
   an indication of a category of merchant, and
   an indication of a credit card account of an account holder;
   determining, by a billing server in communication with the card authorization terminal, a reimbursement rule that is associated with the credit card account,
   in which the reimbursement rule indicates:
   a reimbursement condition,
   a reimbursing party, and
   a period of time for the reimbursing party to remit payment;
   determining, by the billing server, whether the charge data satisfies the reimbursement rule based on the reimbursement condition and the indication of the category of merchant; and
   if the charge data satisfies the reimbursement rule, performing by the billing server the following:
   determining a reimbursement amount based on the reimbursement rule and the charge data;
   determining a first charge amount based on a difference between the transaction amount and the reimbursement amount;
   applying the first charge amount to the credit card account;
   determining a second charge amount based on the reimbursement amount, determining a financial account of the reimbursing party;
   transmitting a billing statement for the financial account to the reimbursing party, in which the billing statement includes an indication of the second charge amount;

determining whether the reimbursing party has remitted a payment of the second charge amount within the period of time for the reimbursing party to remit payment; and applying the second charge amount to the credit card account if the reimbursing party has not remitted a payment of the second charge amount within the period of time for the reimbursing party to remit payment.

4. A method for processing a charge applied to a debit card account, the method comprising:

receiving charge data via a card authorization terminal, in which the charge data includes:
an indication of a transaction amount,
an indication of a category of merchant, and
an indication of a debit card account of an account holder;

determining, by a billing server in communication with the card authorization terminal, a reimbursement rule that is associated with the debit card account,
in which the reimbursement rule indicates:
a reimbursement condition,
a reimbursing party, and
a period of time for the reimbursing party to remit payment;

determining, by the billing server, whether the charge data satisfies the reimbursement rule based on the reimbursement condition and the indication of the category of merchant; and if the charge data satisfies the reimbursement rule, performing by the billing server the following:
determining a reimbursement amount based on the reimbursement rule and the charge data;
determining a first charge amount based on a difference between the transaction amount and the reimbursement amount;
applying the first charge amount to the debit card account;
determining a second charge amount based on the reimbursement amount, determining a financial account of the reimbursing party;
transmitting a billing statement for the financial account to the reimbursing party,
in which the billing statement includes an indication of the second charge amount;
determining whether the reimbursing party has remitted a payment of the second charge amount within the period of time for the reimbursing party to remit payment; and
applying the second charge amount to the debit card account if the reimbursing party has not remitted a payment of the second charge amount within the period of time for the reimbursing party to remit payment.

5. A method comprising:

receiving charge data, via a card authorization terminal, in which the charge data includes:
an indication of a transaction amount, and
an indication of a financial account of an account holder;

determining, by a billing server in communication with the card authorization terminal, a reimbursement rule that is associated with the financial account of the account holder,
in which the reimbursement rule indicates:
a reimbursement condition, and
a reimbursing party;

determining, by the billing server, whether the charge data satisfies the reimbursement rule based on the reimbursement condition and the charge data; and if the charge data satisfies the reimbursement rule, performing by the billing server the following:
determining a reimbursement amount based on the reimbursement rule and the charge data;
determining a first charge amount based on a difference between the transaction amount and the reimbursement amount;
applying the first charge amount to the financial account of the account holder;
determining a second charge amount based on the reimbursement amount, determining a financial account of the reimbursing party;
transmitting to the reimbursing party a billing statement for the financial account of the reimbursing party,
in which the billing statement includes an indication of the second charge amount;
determining whether the reimbursing party has remitted a payment of the second charge amount within a predetermined period of time; and
applying the second charge amount to the financial account of the account holder if the reimbursing party has not remitted a payment of the second charge amount within the predetermined period of time.

* * * * *